July 21, 1959 — E. J. TRUXALL, SR — 2,895,629
BOAT LOADING DEVICE FOR BOAT TRAILERS
Filed Jan. 17, 1958 — 2 Sheets-Sheet 1
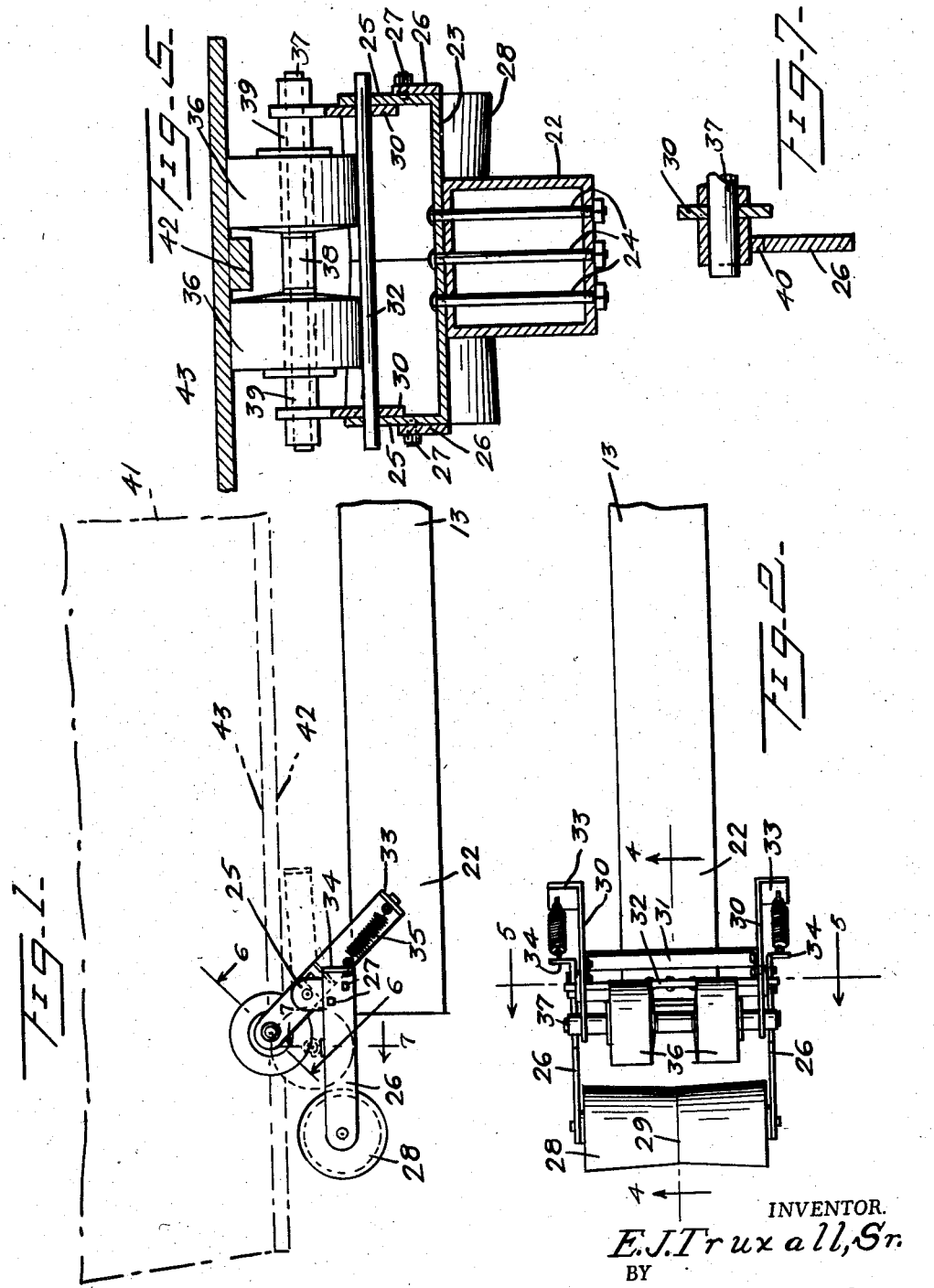
INVENTOR.
E. J. Truxall, Sr.
BY
Kimmel & Crowell

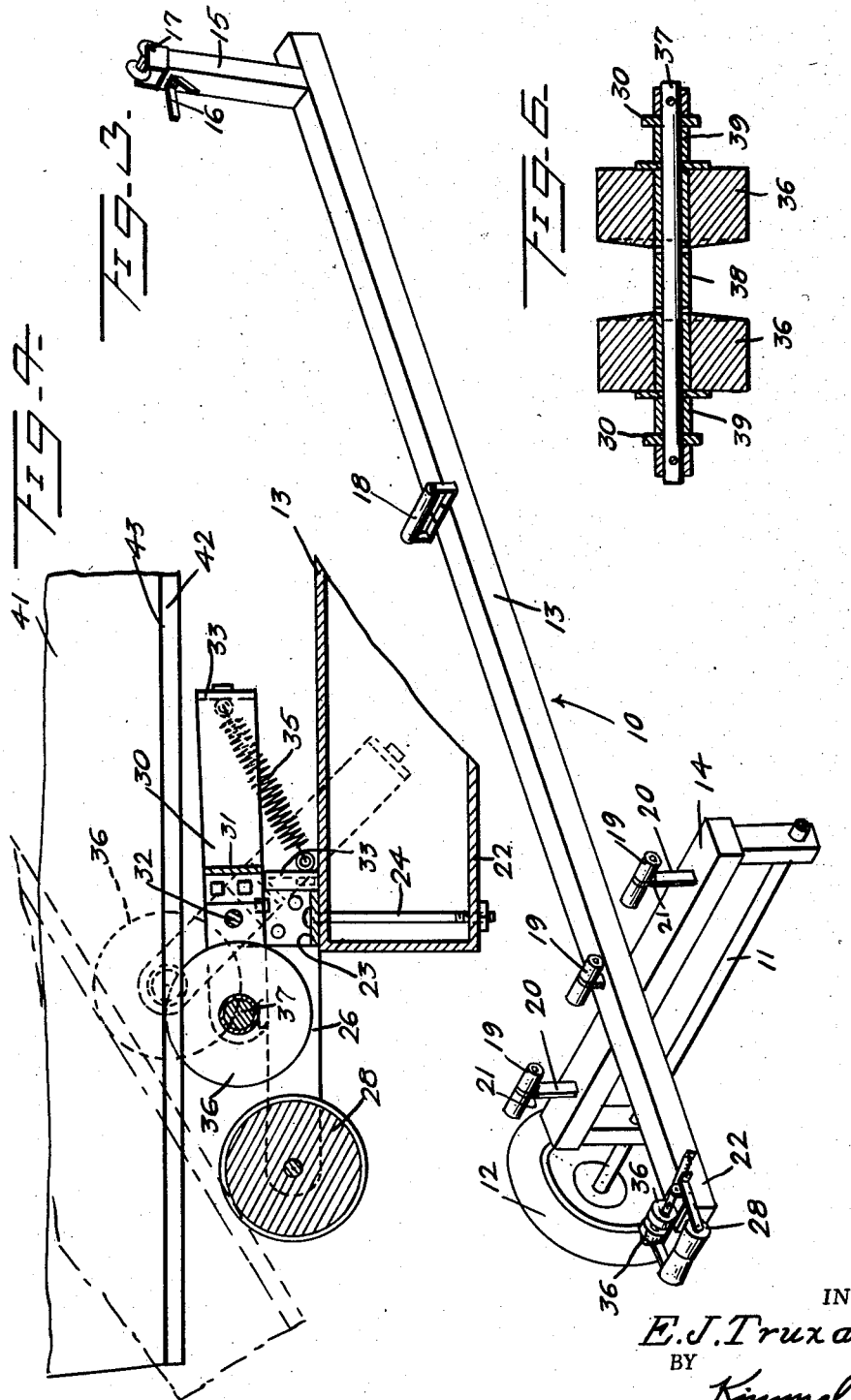

United States Patent Office 2,895,629
Patented July 21, 1959

2,895,629

BOAT LOADING DEVICE FOR BOAT TRAILERS

Ephraim J. Truxall, Sr., Lincoln Park, Mich.

Application January 17, 1958, Serial No. 709,501

2 Claims. (Cl. 214—506)

The present invention relates to structures for assisting in loading boats on boat trailers.

The primary object of the invention is to provide a device for resiliently engaging and guiding the keel of a boat during a boat loading operation on a boat trailer.

Another object of the invention is to provide a device of the class described above in which the spring pressed roller is automatically engaged with the boat in guiding relation to the keel.

A further object of the invention is to provide a boat loading device for use with boat trailers which is inexpensive to manufacture, simple to use, and which effectively prevents a loading operation in which the boat is misaligned with the trailer.

Other objects and advantages will become apparent in the following specification when considered in the light of the attached drawings, in which:

Figure 1 is a fragmentary side elevation of the invention.

Figure 2 is a fragmentary top plan view of the invention.

Figure 3 is a perspective view of a boat trailer with the invention attached thereto.

Figure 4 is a fragmentary vertical cross-section taken along the line 4—4 of Figure 2, looking in the direction of the arrows.

Figure 5 is an enlarged fragmentary vertical cross-section taken along the line 5—5 of Figure 2, looking in the direction of the arrows.

Figure 6 is an enlarged fragmentary transverse cross-section taken along the line 6—6 of Figure 1, looking in the direction of the arrows.

Figure 7 is an enlarged fragmentary vertical cross-section taken along the line 7—7 of Figure 1, looking in the direction of the arrows.

Referring now to the drawings in detail wherein like reference characters indicate like parts throughout the several figures, the reference numeral 10 indicates generally a boat trailer of the type having a transverse axle 11 carrying supporting wheels 12 on opposite ends thereof, and an elongated tow bar 13 secured to the axle 11 by means of a frame 14.

A post 15 is arranged in upstanding relation on the front of the tow bar 13 and has a bow guide 16 secured on the rear face thereof and a winch 17 secured to the top thereof. A keel roller 18 is journalled transversely of the tow bar 13 intermediate the opposite ends thereof. A pair of side rollers 19 are positioned on the frame 14 on mounts 20 and are arranged for swinging movement about a horizontal longitudinally extending pivot 21 to permit the rollers 19 to conform to the shape of a boat.

The rear end 22 of the tow bar 13 is positioned rearwardly of the frame 14 and has a transversely extending bracket 23 secured thereto by means of bolts 24. The bracket 23 has upstanding ears 25 formed on the opposite ends thereof, as best seen in Figure 5, and each of the ears 25 has a rearwardly extending arm 26 secured thereto by means of bolts 27.

The arms 26 extend rearwardly of the tow bar 13 and have a roller 28 journaled therebetween in transverse horizontal relation. The roller 28 tapers toward its center 29 to assist in guiding the keel of a boat placed thereon.

A pair of bars 30 are arranged in spaced parallel relation and are rigidly connected by a U-shaped bracket 31 extending therebetween. The bars 30 are pivotally secured to the upper ends of the ears 25 by means of a pivot pin 32. The forward ends of the bars 30 are perpendicularly offset at 33 and the forward ends of the arms 26 are perpendicularly offset at 34.

A coil spring 35 is arranged in parallel relation adjacent to each of the pivot bars 30 and have their opposite ends, respectively, connected between the offset portion 33 and the offset portion 34 to normally bias the offset portion 33 of the bars 30 downwardly so that the opposite ends thereof are biased upwardly.

A pair of rollers 36 are journalled on a shaft 37 supported by the bars 30 and the rollers 36 are maintained in spaced relation with respect to each other by means of an intermediate sleeve 38 and are spaced away from the bars 30 by spacer sleeves 39.

The shaft 37 extends outwardly beyond the bars 30 and is arranged to engage stop lugs 40 secured to the upper edges of the arms 26.

In the use and operation of the invention, a boat, indicated generally at 41, is provided with a keel 42 on the bottom 43 thereof. In loading the boat 41 on the trailer 10, the keel 42 of the boat is first engaged with the roller 28 and a cable (not shown) from the winch 17 is secured to the bow of the boat so that the loading operation can begin.

Operation of the winch 17 will cause the keel 42 to engage between the rollers 36 and as the weight of the boat comes on the rollers 36, the springs 35 will maintain the rollers 36 in engagement with the bottom of the boat. The spring loaded rollers 36 will hug the keel as the boat is raised and will form a guide to bring the boat onto the trailer in aligned relation thereto. Even if the boat is not aligned perfectly with the trailer 10, pressure on the keel 42 of the boat 41 from the rollers 36 will assist in aligning the boat with the trailer 10.

Having thus described the preferred embodiment of the invention, it should be understood that numerous structural modifications and adaptations may be resorted to without departing from the scope of the appended claims.

What is claimed is:

1. A boat loading attachment for boat trailers of the type having an elongated central boat supporting tow bar comprising a transversely extending U-shaped bracket adapted for attachment to the rear end of said tow bar to extend upwardly therefrom, a pair of spaced parallel arms rigidly secured to said bracket adjacent their forward ends, a transversely extending keel supporting roller journalled between said arms adjacent the rear ends thereof with said roller positioned above the plane of said tow bar, a pair of spaced parallel bars, a second U-shaped bracket extending between and rigidly connecting said pair of bars, transversely extending pivot means connecting said pair of bars intermediate their opposite ends to said first named U-shaped bracket above said arms, a pair of spaced apart axially aligned rollers positioned between the rear end portions of said pair of bars, means journalling said pair of rollers on said pair of bars, and spring means extending between said pair of bars and said pair of arms normally biasing said pair of bars in a direction to move said pair of rollers upwardly away from said roller journalled in said arms, said pair of rollers being adapted to closely engage on opposite sides of the keel of a boat being loaded on said trailer to guide said boat by maintaining said keel in central position with respect to said trailer.

2. A device as claimed in claim 1 wherein said arms have outwardly offset forward end portions and said pair of bars have outwardly offset forward end portions with said spring means comprising a pair of coil springs connecting the offset end portions of said arms with the offset end portions of said pair of bars.

References Cited in the file of this patent

UNITED STATES PATENTS

| | | |
|---|---|---|
| 2,586,485 | Schroeder | Feb. 19, 1952 |
| 2,708,045 | Shontz | May 10, 1955 |
| 2,805,786 | Green | Sept. 10, 1957 |